UNITED STATES PATENT OFFICE.

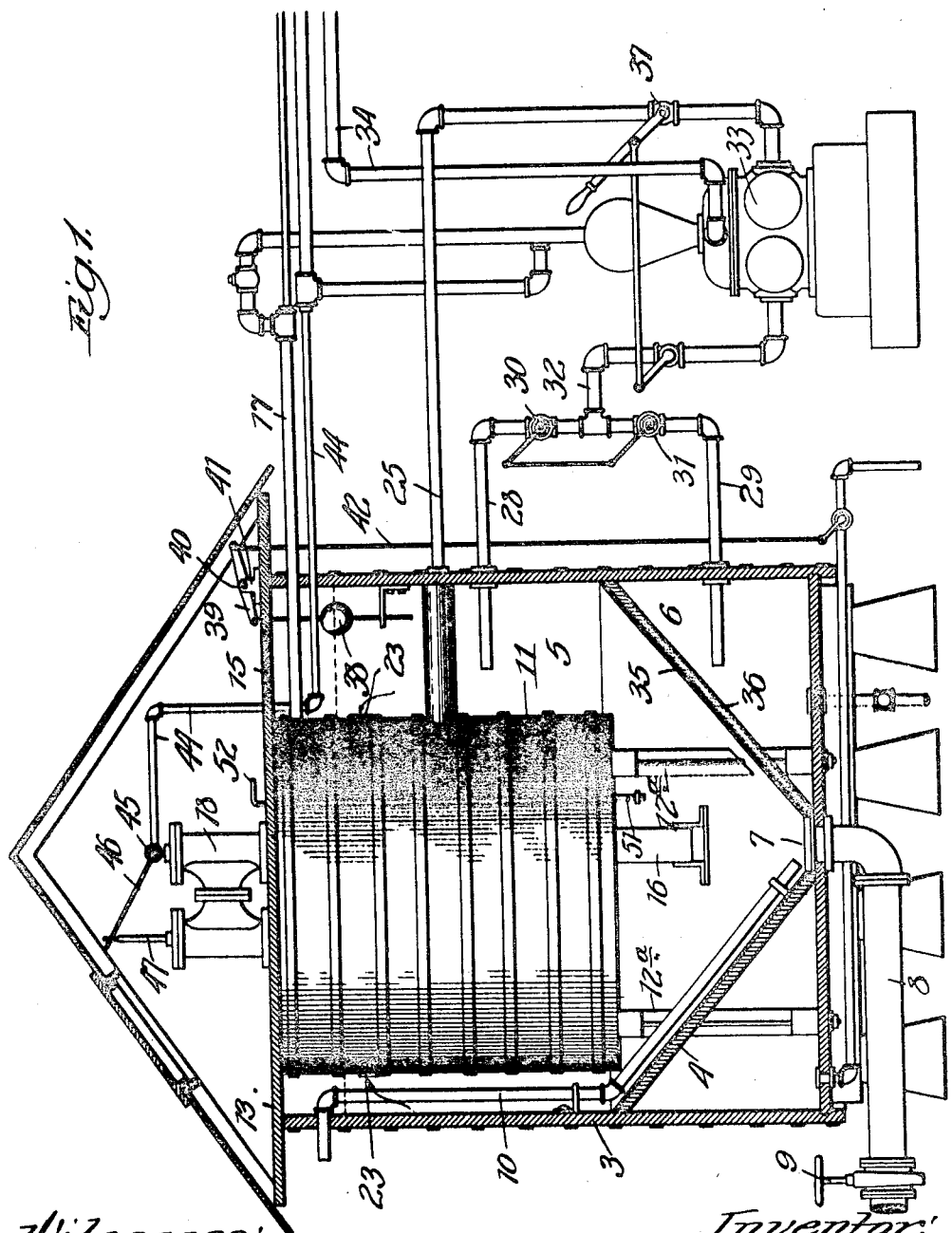

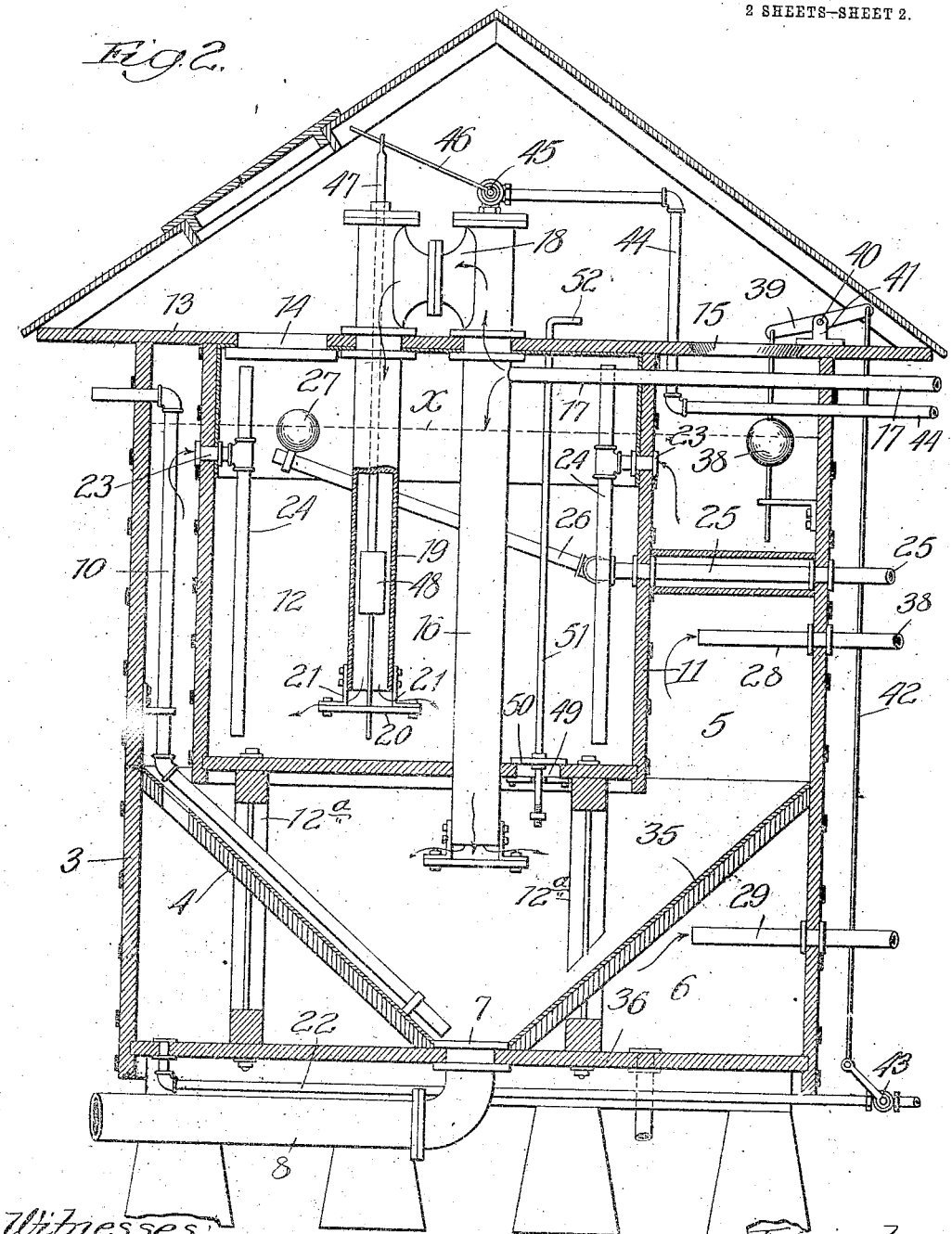

DAVID L. WINTERS, OF CHICAGO, ILLINOIS.

WATER STORING AND HEATING APPARATUS FOR BOILERS.

1,079,623.  Specification of Letters Patent.  Patented Nov. 25, 1913.

Application filed November 25, 1912. Serial No. 733,404.

*To all whom it may concern:*

Be it known that I, DAVID L. WINTERS, a citizen of the United States, residing at 2140 West Van Buren street, Chicago, in the county of Cook and State of Illinois, have invented new and useful Improvements in Water Storing and Heating Apparatus for Boilers, of which the following is a specification.

My invention relates more particularly to water storing and heating apparatus for use in connection with locomotives.

It is necessary in operating locomotives that the boilers thereof be cleaned, at intervals, of the accumulations therein of mud, or the like, contained in the water used and according to common practice the water contained in the boilers of locomotives to be cleaned is discharged at boiling-point temperature into tanks, the emptied boilers thereupon flushed with water at about 130° F. to remove the accumulated mud therein and then refilled with water preferably at or near the boiling point. These operations in accordance with methods hitherto practised, where effected with the minimum loss of time during which the locomotives are out of commission, result in a relatively great loss of the heat in the water and steam discharged from the boilers in the emptying operation, the loss of a large percentage of the water taken from the boilers, and in the necessity of using live-steam from a source independent of the locomotive for heating the water preparatory to refilling the boilers and consequently the expense of the boiler washing and refilling operations is relatively great.

My primary object is to provide an apparatus of the character above stated which shall be simple of construction, economical of manufacture, have relatively large capacity, not liable to become out of order, and by the use of which the water discharged from the boilers and the heat therein and in the steam may be conserved and utilized substantially without loss for heating the water to the desired temperature before the boilers are washed and refilled therewith.

Referring to the accompanying drawings:—Figure 1 is a view in sectional elevation of a water storing and heating apparatus constructed in accordance with my invention, showing the heating chamber in full elevation; and Fig. 2, an enlarged view showing the heating chamber in section.

3 represents a tank which is preferably made of heat-non-conducting material, such as wood, this tank containing an inverted frusto-conical partition 4 in its lower end dividing the tank into an upper chamber 5 the bottom of which is the partition 4, which forms a hopper-like bottom for this chamber, and a lower chamber 6 surrounding the hopper-bottom 4, the chamber 5 opening at its lower end as indicated at 7 into a discharge-pipe 8 provided with a valve 9 for a purpose hereinafter described, and containing a pipe 10 which extends at its lower end closely adjacent to the outlet 7 and at its upper end through the wall of the chamber 5 near the upper end of the latter.

The chamber 5 contains a smaller, preferably wooden, tank 11, affording a chamber 12 supported on uprights 12ª in the tank 3 to be spaced at its sides and bottom from the tank containing it as represented in the drawings, the tanks 3 and 11 having a steam-tight cover 13 containing a man-hole 14 opening into the chamber 12 and a gravity-seated removable section 15 in the top of the chamber 5.

Extending through the chamber 12 and projecting at its upper end above the top of said chamber and at its lower open end into the chamber 5, is a pipe 16, preferably vertically disposed, this pipe communicating between its ends with one end of a pipe 17 which in practice is connected at its opposite end with the blow-off connection on the boiler to be emptied, the pipe 16 being preferably of relatively greater diameter than the pipe 17 for a purpose hereinafter set forth. The upper end of the pipe 16 connects through the medium of an elbow 18 with the upper end of a depending steam-conducting pipe 19 which extends into the chamber 12 through the top 13 thereof, the lower end of the pipe 19 being open and equipped with a spreader formed of a plate 20 secured to the pipe 19 by means of spaced brackets 21.

The chamber 6, which is adapted to be fed with fresh water as from a pipe 22 connected with a supply thereof (not shown), communicates with the chamber 5 through an opening in the hopper-bottom 4 and the chamber 5 communicates with the chamber 12 through the medium of pipes 23 each of which opens at one end into the chamber 5 near the upper end of the latter, but below the normal water level therein hereinafter referred to, and at its opposite end into a vertically-disposed pipe 24 in the chamber 12, the upper and lower ends of the pipes 24 being open and extending respectively above the normal water level in the chamber 12 and close to the lower end of the latter, the pipes 24 being preferably arranged equidistantly about the inner surface of the chamber 12.

The chamber 12, which by reason of the action produced on the water therein as hereinafter described, I have chosen to term a heating-chamber, communicates with an outlet-pipe 25 which in practice is valved, with the inner end of which is flexibly connected a lift-pipe 26 carrying at its free open end a float 27, which serves at all times to hold the inlet end of the pipe 26 submerged in the upper portion of the water in the chamber 12 for insuring the drawing off of the hottest water therein, when the pipe 25 is opened, as hereinafter described.

The operation of the apparatus, so far as it has been described, assuming that the chambers 5 and 12 are filled with warm water to a point above the pipes 23, say to the level indicated by the dotted line $x$, is as follows: The water and steam blow-off pipe of a boiler (not shown) to be emptied, washed and refilled is connected with the pipe 17 and the hot water and steam in the boiler discharged therethrough and into the pipe 16. The diameter of the latter, relative to the pipe 17, is such that the force of the steam and water discharged into the pipe 16 is reduced to a degree permitting the hot water, practically at boiling temperature, to descend by gravity in the pipe 16 and the steam therein to rise and pass into the pipe 19. The water in the pipe 16 is forced from the spreader-equipped lower end of the pipe 16 into the water in the tank 5, and the steam in the pipe 19 is forced into the water at the bottom portion of the chamber 12, the water at this point being of less pressure than in the lower part of chamber 5. The hot water and steam thus introduced into the chambers 5 and 12, respectively, rise to the top of the water therein, thus causing the hottest part of the water in these chambers to be at the top thereof. As soon as the water in the chamber 12 has become heated to substantially boiling temperature, the steam as it continues to enter the water in this chamber, passes upwardly therethrough and enters the space between the water in the chamber 12 and the top of the latter and upon accumulating therein, under pressure, forces the water in this chamber through the pipes 24 and pipe 23 into the chamber 5 and as soon as the level of the water in the chamber 12 falls below the opening in the pipe 23, the steam thus trapped in the chamber 12 passes through these pipes into the upper part of the water in the chamber 5 and thus heats this water, the gravity-seated section 15 of the cover 13 serving as a safety valve for relieving the steam-pressure in the water-chambers in the event of its increasing to an objectionable predetermined degree.

In the operation of the apparatus it is intended that the water for washing out the boiler be drawn from the chambers 5 and 6 at the desired temperature, as hereinafter described, and when thus drawn off the level of the water in the chambers 5 and 12 is lowered, and to compensate for this, fresh water from a service main is introduced through the pipe 22 into the chamber 6 and as this water is relatively cold its introduction into the apparatus causes the hottest water in the chamber 5, viz. at the top thereof, to be forced through the pipes 23 and 24 into the lower part of the chamber 12.

The water for wash-out purposes is preferably drawn out of the apparatus at different temperatures and, in commingled condition, introduced into the wash-out parts of the boiler. A desirable way of effecting this is to provide the chambers 5 and 6 with draw-off pipes 28 and 29 valved as indicated at 30 and 31 respectively, and uniting with a valved pipe 32 leading to a pump 33 having a discharge-pipe 34. The water in the chamber 6 at the pipe 29 is somewhat heated say to about 110° by radiation of the heat from the chamber bottom 4, which latter is preferably formed of a copper sheet 35 braced by radial ribs 36 located beneath the sheet 35 and spaced apart to permit of the desired radiation, and the water in the chamber 5 at the pipe 28 is considerably hotter, say about 160°, and thus by regulating the valves 30 and 31, the water discharged into the pipe 32 may be caused to be of the desired temperature for wash-out purposes, say about 135°.

It is intended that the water in the chamber 12 be used to refill the boiler after the washing operation, and that the hottest water in this chamber be utilized for this purpose, and to this end the pipe 25, which is valved as indicated at 37, leads into the pump 33 and by operating the latter the refilling water, which is taken from the upper portion of the water in the chamber 12, the float 27 insuring this condition regardless of the level of the water in this chamber, is forced at substantially boiling temperature into the boiler to be refilled.

As hereinbefore stated it is preferred that the water level in the apparatus be maintained above the pipes 23 for the reasons manifest from the foregoing description and the apparatus should be made of such proportions that a storage space of sufficient size be provided between the water level x and the top of the chambers 5 and 12, for receiving the water from a plurality of boilers so that the emptying of a boiler and the refilling thereof need not be practised alternately, but a number of boilers may be emptied before refilling takes place, it being understood that the proportioning of the apparatus will depend on the particular conditions attending its use as will be manifest to those skilled in the art.

In order that the water level in the apparatus be not allowed to fall below the level x, in accordance with the preferred manner of operating the apparatus, I provide a float 38 which rests upon the top of the water in the chamber 5 and connects with one end of a lever 39 fulcrumed, as indicated at 40, on a stationary part 41 of the apparatus, the opposite end of the lever 39 being connected, through the medium of a link 42 with a valve 43 in the pipe 22, whereby the float 38 serves to open the valve 43 and hold it open, for permitting water to enter the apparatus through the pipe 22, until the water reaches the level x.

Under some conditions of use locomotives which have not contributed heat to the apparatus will be washed and filled, or the water will be allowed to remain in the apparatus for a relatively long time between the operation of emptying the heated contents of a boiler into the apparatus and the refilling of a boiler, so that the water in the chambers of the apparatus, even though the heat therein is conserved to a high degree as hereinafter explained, will fall below the desired temperature unless artificially heated. To this end I prefer to connect a live-steam pipe 44 with the upper end of the pipe 16 by a valved connection 45, and connect to an operating arm 46 on the valve 45 a rod 47, which extends downwardly into the pipe 19 wherein it is guided and carries a float 48. The float operates when submerged in water in the pipe 19 to rise and open the valve 45, but is sufficiently weighted to close this valve when the water lowers in this pipe. So long as steam enters the pipe 19 from the pipe 17 the water in the pipe 19, under the pressure of the steam therein, is forced below the float 48 and consequently the latter remains in lowered condition in which the supply of live-steam to the pipe 19 is cut off. As soon, however, as the supply of steam from the pipe 17 ceases, the water rises in the pipe 19 and the valve 45 is thus opened, the float 48 thereby serving to cause steam for heating the water in the apparatus to enter the latter at all times and thus insure the heating of the water to the desired degree.

The water discharged from the boiler to be emptied, washed and refilled, into the chamber 5, which is in effect a settling chamber, contains more or less mud which settles upon the hopper-bottom 4 of this chamber and requires to be withdrawn therefrom periodically. In the form of apparatus illustrated this may be accomplished by opening the valve 9, the water in passing from the chamber 5 through its outlet 7 carrying the mud with it and cleaning this chamber. The pipe 10 serves as a means for automatically removing mud from the lower portion of the chamber 5 when water from boilers is introduced into the apparatus in sufficient amounts to raise the level of the water therein above the upper end of the pipe 10.

It is preferred that the tank 11 contain, in its bottom, a port 49 controlled by a downwardly-seating valve 50 provided with a rod 51 extending up through the chamber 12 and having a handle 52 at its upper end. The provision of such a valve serves to afford means whereby as water enters the chamber 5 it will, at the same time, flow into the chamber 12 and rise substantially at the same rate in these chambers, thereby preventing undue strain on the tank 11 such as would occur if no water entered the chamber 12 until it overflowed into it from the chamber 5 through the pipes 23 and 24. This valve also permits the chamber 12 to be emptied, if desired.

One of the chief advantages of an apparatus constructed in accordance with my invention, is the full utilization of the hot water and steam discharged from the boiler to be emptied for heating the boiler-refilling water, and the conserving of the heat therein, the location of the heating-chamber in the chamber 5 operating very effectually to prevent the heat in the water in the heating tank from being lost by radiation.

Among the other advantages afforded by my improved apparatus is that due to the introduction of the steam and hot water into the stored water below the level thereof whereby the hot water and steam in rising therethrough serves to heat the mass.

What I claim as new and desire to secure by Letters Patent is:

1. In an apparatus of the character set forth, the combination of a plurality of water-chambers, a passage connecting said chambers for the passage of water from one to the other of said chambers, and means for conducting the water from a boiler to be emptied into one of said chambers and the steam in the boiler into the other of said chambers.

2. In an apparatus of the character set forth, the combination of a plurality of water-chambers, means for conducting the water from a boiler to be emptied into one of said chambers near the bottom thereof and the steam in the boiler into the other of said chambers, and means for conducting the water at the top of the chamber into which the water from the boiler is introduced, into the other of said chambers.

3. In an apparatus of the character set forth, the combination of a plurality of water-chambers, means for conducting the water from a boiler to be emptied into one of said chambers near the bottom thereof and the steam in the boiler into the other of said chambers, and means for conducting the water at the top of the chamber into which the water from the boiler is introduced, into the lower part of the other of said chambers.

4. In an apparatus of the character set forth, the combination of a plurality of water-chambers, means for conducting the water from a boiler to be emptied into one of said chambers near the bottom thereof and the steam in the boiler into the other of said chambers near the bottom thereof, and a pipe opening at one end into said last referred to chamber near the bottom thereof and at its opposite end into the other of said chambers near the top thereof.

5. In an apparatus of the character set forth, the combination of a plurality of chambers, a passage connecting said chambers for the passage of water from one to the other of said chambers, a pipe adapted to be connected with the boiler to be emptied for conducting the water and steam to said apparatus, and a pipe disposed at angles to said first-named pipe and into which the latter opens, said last-named pipe communicating at its lower end with one of said chambers and leading from its upper end into the other of said chambers.

6. In an apparatus of the character set forth, the combination of a plurality of chambers, an upright pipe adapted to be connected with the boiler to be emptied for receiving the water and steam, said pipe extending into one of said chambers and discharging the water into the other of said chambers, and means for conducting the steam in said pipe into the chamber into which said pipe extends.

7. In an apparatus of the character set forth, the combination of a plurality of chambers, a pipe adapted to be connected with the boiler to be emptied for conducting the water and steam to said apparatus and discharging the water into one of said chambers, means for conducting the steam in said pipe into the other of said chambers, and means connecting the chamber into which the water from the boiler is discharged, at the top thereof, with the other of said chambers near the bottom thereof.

8. In an apparatus of the character set forth, the combination of a chamber, means for discharging fresh water into said chamber, a second chamber in said first-named chamber and communicating with the latter, and means for conducting the water from the boiler to be emptied, into said second-named chamber.

9. In an apparatus of the character set forth, the combination of a chamber, means for introducing fresh water into said chamber, a second chamber extending into said first-named chamber and provided with a hopper-shaped bottom formed of heat-conducting material and containing an opening for causing said chambers to communicate with each other, and means for conducting the water from the boiler to be emptied, into said second-named chamber.

10. In an apparatus of the character set forth, the combination of water-chambers, a passage connecting said chambers for the passage of water from one to the other of said chambers, means for conducting the water from the boiler to be emptied, into one of said chambers and the steam in the boiler into the other of said chambers, and means for trapping the surplus steam in the chamber into which it is introduced and discharging the surplus steam into the water at the upper part of the other of said chambers.

11. In an apparatus of the character set forth, the combination of a plurality of water-chambers, means for conducting the water from the boiler to be emptied into one of said chambers, and the steam from the boiler into the other of said chambers, means connecting the chamber into which the water is introduced from the boiler, at the upper end thereof, with the lower part of the other of said chambers, and means for trapping the surplus steam in the chamber into which it is introduced and discharging said surplus steam into the water in the upper part of the other of said chambers.

12. In an apparatus of the character set forth, the combination of a plurality of chambers, means for conducting the water from the boiler to be emptied, into one of said chambers and steam from the boiler into the other of said chambers, and a pipe opening at its upper and lower ends into the upper and lower parts, respectively, of the chamber into which the steam is introduced and communicating between its ends with the upper part of the other of said chambers, for the purpose set forth.

13. In an apparatus of the character set forth, the combination of a water-chamber, means for supplying fresh water to said chamber, a second chamber in communication with said first-named chamber to equalize the water-pressures therein, means for conducting the water from the boiler to be emptied, into said second chamber, and means for drawing off water from both of said chambers and commingling the same, for the purpose set forth.

14. In an apparatus of the character set forth, the combination of a chamber, means for introducing fresh water into said chamber, a second chamber located in said first-named chamber and in communication with the latter, whereby the water-pressures in said chambers are equalized, means for discharging into said second named chamber water from the boiler to be emptied, whereby the water in said first-named chamber is heated, and branch pipes leading, respectively, from said chambers, whereby water drawn through said pipes is caused to commingle, for the purpose set forth.

15. In an apparatus of the character set forth, the combination of a settling-chamber, an inclosed heating-chamber in communication with said settling-chamber, means for conducting hot water from the boiler to be emptied into said settling-chamber, means for conducting steam from said boiler into said heating tank, and means for conducting the surplus steam in said heating-chamber into storage water of lower temperature than that of the water in said heating-chamber.

16. In an apparatus of the character set forth, the combination of a settling-chamber, a covered heating chamber in said settling-chamber and communicating therewith, means for conducting hot water from a boiler to be emptied into said settling chamber, means for conducting steam from said boiler into said heating-chamber, and means for conducting the surplus steam in said heating-chamber into storage water of lower temperature than that of the water in said heating chamber.

17. In an apparatus of the character set forth, the combination of a chamber, a conduit extending into the water in said chamber and open thereto, a source of live steam, a pipe for conducting steam from said supply to said conduit, means for introducing steam from a source independent of said live steam supply, into said conduit, and means controllable by the water colum in said conduit for automatically introducing therein live steam from said source when the supply of steam from said other source to said conduit ceases.

18. In an apparatus of the character set forth, the combination of a water-chamber, means for introducing water from the boiler to be emptied, into said chamber, a heating chamber in said water-chamber and entirely surrounded by the latter, and in communication therewith, and means for heating the water thus stored by the steam discharged from the boiler to be emptied.

19. In an apparatus of the character set forth, the combination of a water-chamber, means for introducing water from the boiler to be emptied, into said chamber, a heating chamber in said water-chamber and entirely surrounded by the latter, and in communication therewith, and means for introducing steam into said heating chamber.

20. In an apparatus of the character set forth, the combination of a settling-chamber, an inclosed heating chamber, means for conducting hot water from the boiler to be emptied, into said settling-chamber, means for conducting steam from said boiler into said heating chamber, and means for conducting the surplus steam in said heating chamber into storage water of lower temperature than that of the water in said heating chamber.

21. In an apparatus of the character set forth, the combination of a water-chamber, means for introducing water from the boiler to be emptied, into said chamber, a heating-chamber in said water-chamber and entirely surrounded by the latter, and means for introducing steam from the boiler to be emptied, into said heating-chamber.

22. In an apparatus of the character set forth, the combination of a chamber, a heating-chamber, means for causing the water at the upper portion of said first-named chamber to flow into said heating-chamber, means for conducting the steam from the boiler to be emptied into said heating-chamber, and means for trapping the surplus steam in said heating-chamber and discharging it into the upper portion of the water in said first-named chamber.

23. In an apparatus of the character set forth, the combination of a settling-chamber, an inclosed heating-chamber located in said settling-chamber, a pipe extending from the upper part of said settling-chamber into the lower part of said heating-chamber to cause hot water to flow from said settling-chamber into said heating-chamber, and a pipe opening into said heating-chamber above the water-line therein and opening into said settling-chamber below the water-line therein for causing surplus steam in said heating-chamber to enter the water in said settling-chamber.

24. In an apparatus of the character set forth, the combination of a settling-chamber, a heating-chamber, means for conducting water from the boiler to be emptied into said settling-chamber and steam in the boiler into said heating-chamber, and a pipe opening at one end into said heating-chamber above the water-level therein and opening at its opposite end into said settling-chamber below the water level therein.

25. In an apparatus of the character set forth, the combination of a settling-chamber, a heating-chamber located in said settling-chamber, means for conducting water from the boiler to be emptied into said settling-chamber and steam in the boiler into said heating-chamber, and a pipe opening at one end into said heating-chamber above the water-level therein and opening at its opposite end into said settling-chamber below the water-level therein.

26. In an apparatus of the character set forth, the combination of a settling chamber, a heating-chamber, a passage connecting said chambers together for the passage of water from said settling-chamber into said heating-chamber, means for conducting water from the boiler to be emptied into said settling chamber and steam in the boiler into said heating-chamber, and a pipe opening at one end into said heating-chamber above the water-level therein and opening at its opposite end into said settling-chamber below the water-level therein.

27. In an apparatus of the character set forth, the combination of a heating-chamber, means for introducing into said chamber steam from the boiler to be emptied, a pipe opening into said chamber, a source of live steam supply connected with said pipe, and automatically-operating means in said pipe for controlling the supply of live steam to said chamber.

28. In an apparatus of the character set forth, the combination of a heating-chamber, a pipe opening into said chamber, means for conveying to said pipe the steam from the boiler to be emptied, a source of live steam supply connected with said pipe, and automatically-operating means in said pipe for controlling the supply of live steam thereto.

29. In an apparatus of the character set forth, the combination of a heating-chamber, means for introducing into said chamber steam from the boiler to be emptied, a pipe opening into said heating-chamber, a source of live-steam supply in communication with said pipe, and automatically-operating means in said pipe for controlling the discharge of live steam into said pipe, for the purpose set forth.

30. In an apparatus of the character set forth, the combination of a heating-chamber, a pair of pipes of different lengths and connected at their upper ends, the shorter one of which opens into said heating-chamber and extends into the water therein, and a pipe for conducting the blow-off water and steam into the pipe of greater length.

31. In an apparatus of the character set forth, the combination of a heating-chamber, a second chamber, a pair of pipes of different lengths connected at their upper ends, the shorter one of which opens into said heating-chamber and extends into the water therein, and the longer one of which opens into said second chamber, and means for conducting the blow-off water and steam into the pipe of greater length.

32. In an apparatus of the character set forth, the combination of a heating-chamber, a second chamber, a pair of pipes of different lengths connected at their upper ends, the shorter one of which opens into said heating chamber and extends into the water therein, and the longer one of which opens into said second chamber, means for conducting the blow-off water and steam into the pipe of greater length, a source of live steam supply, and means in said pipe of shorter length for conducting live steam from said supply into said pipe, for the purpose set forth.

33. In an apparatus of the character set forth, the combination of a heating-chamber, a second chamber, a pair of pipes of different lengths connected at their upper ends, the shorter one of which opens into said heating-chamber and extends into the water therein, and the longer one of which opens into said second chamber, means for conducting the blow-off water and steam into the pipe of greater length, a source of live steam supply, a pipe-connection between said source and said shorter pipe and float-controlling means in said pipe of shorter length for controlling the passage of live steam from said source into said pipe.

34. In an apparatus of the character set forth, the combination of a water-chamber, a conduit extending into the water in said chamber and open thereto, a source of live steam supply, and means controlled by the water column in said conduit for controlling the admission of live steam from said supply into said conduit.

DAVID L. WINTERS.

In presence of—
 E. D. STEELE,
 L. HEISLAR.